P. T. PARKER.
SWEET POTATO PRESERVING HOUSE.
APPLICATION FILED APR. 27, 1912.
1,043,624.
Patented Nov. 5, 1912.
2 SHEETS—SHEET 1.
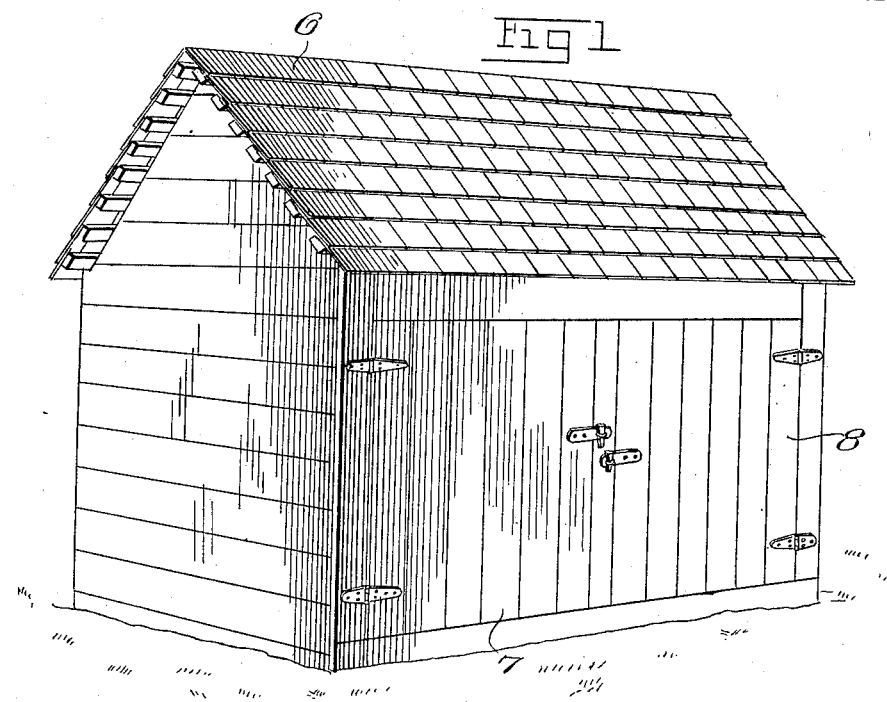
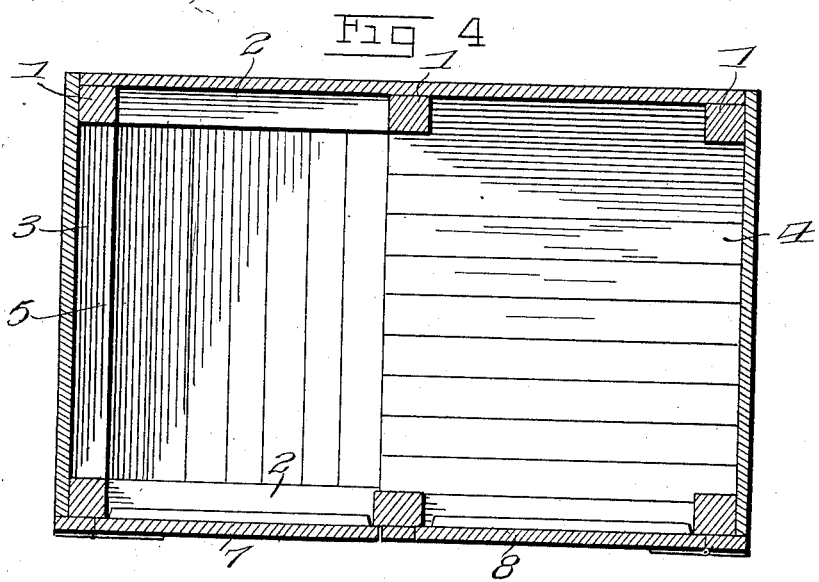
Witnesses
Inventor
Phillip T. Parker
By Victor J. Evans
Attorney

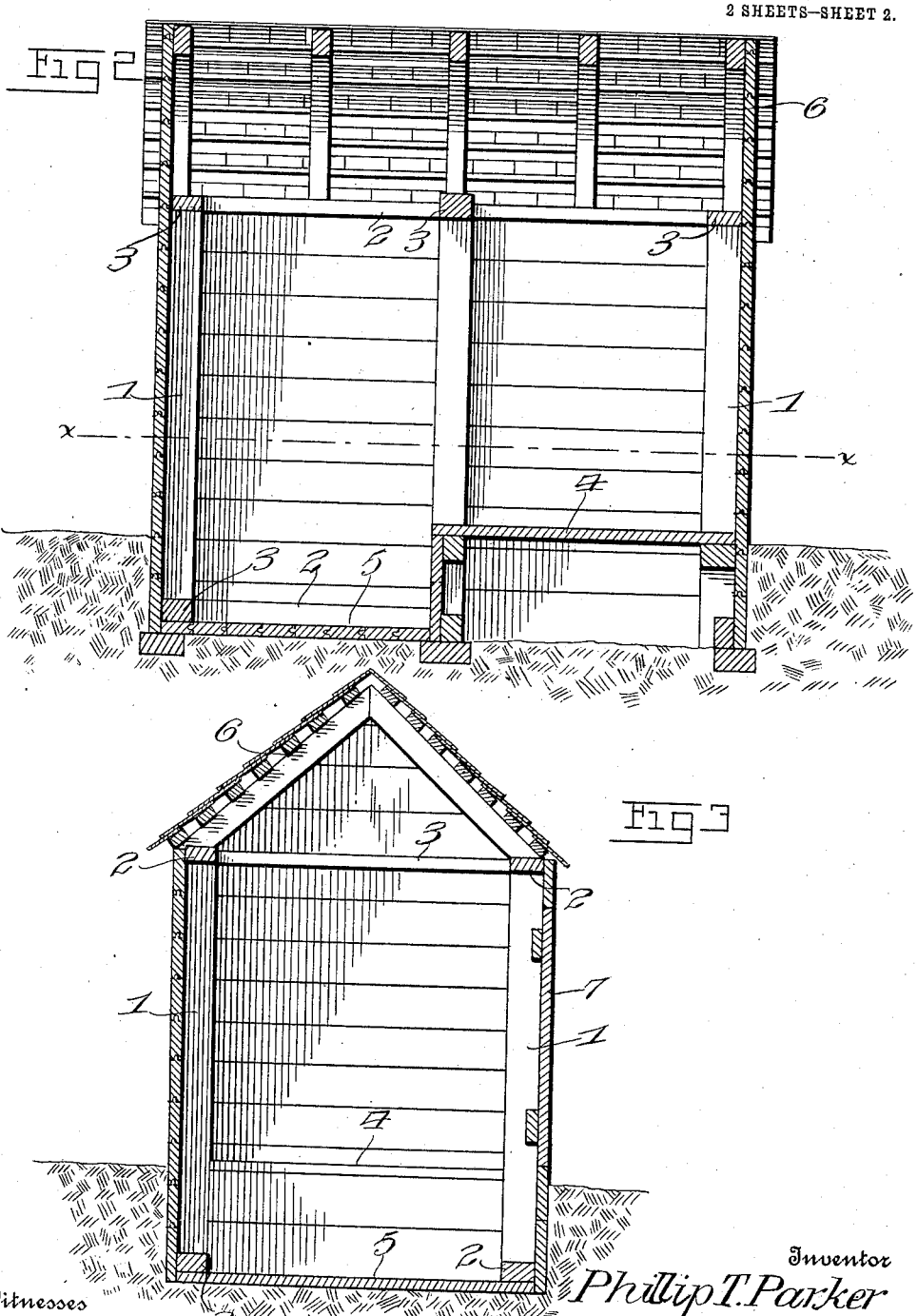

UNITED STATES PATENT OFFICE.

PHILLIP T. PARKER, OF McKENZIE, ALABAMA.

SWEET-POTATO-PRESERVING HOUSE.

1,043,624.  Specification of Letters Patent.  Patented Nov. 5, 1912.

Application filed April 27, 1912. Serial No. 693,716.

*To all whom it may concern:*

Be it known that I, PHILLIP T. PARKER, a citizen of the United States, residing at McKenzie, in the county of Butler and State of Alabama, have invented new and useful Improvements in Sweet-Potato-Preserving Houses, of which the following is a specification.

The specific purpose of the present invention is the provision of a structure for housing sweet potatoes in a manner to prevent rot or destruction by frost, the essential principle involved being a removal of excessive moisture so that the partially desiccated potato has its sweetness enhanced and is otherwise rendered not susceptible to the destructive influence of frost, the potato thus preserved being as palatable and nutritive as when first gathered.

The invention contemplates a desiccator or inclosing structure which will admit of a free circulation of air therethrough, with the result of carrying off excessive moisture from the potatoes to partially desiccate them, with the result that the potatoes may be exposed to extreme cold without suffering injurious results.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a perspective view of a sweet potato desiccator or preserving house embodying the invention. Fig. 2 is a vertical central longitudinal section of the house. Fig. 3 is a transverse section. Fig. 4 is a horizontal section on the line *x—x* of Fig. 2.

Corresponding and like parts are referred to in the following description, and indicated in all the views of the drawings, by the same reference characters.

The desiccator or house has a portion above ground and a portion extending below the surface of the ground, the latter increasing the storage capacity besides utilizing the latent heat of the earth to prevent frost from injuring the potatoes stored in the house during extreme cold weather. The framework of the house embodies uprights 1, longitudinal plates or timbers 2 and cross pieces 3, the several frame elements being connected together in any substantial way. The floor of the house comprises two portions 4 and 5 which are at different levels, the part 4 being elevated or on a level approximately with the surface of the ground, whereas the part 5 is depressed or on a level with the lowest portion of the house which is set into the ground. The depressed portion 5 forms in effect the floor to the cellar and the elevated portion 4 is the floor of the dry house. The house has a gable roof 6 which may be of any construction, preferably consisting of shingles attached to strips in the manner well understood in the formation of shingle roofs. The two ends and the back of the house or desiccator are closed, whereas the front is provided with two doors 7 and 8, the door 7 leading into the portion of the house provided with the cellar, whereas the door 8 opens into the drying chamber of the house. The doors 7 and 8 together practically constitute or form the front of the house and when closed may be secured in any manner. The roof of the house is closed so as to exclude rain, snow and sleet. The sides of the house and the doors thereof are preferably constructed of strips or boards which are arranged to form a closed structure.

It has been discovered that sweet potatoes stored in a house constructed substantially as herein described are not liable to rot and are not susceptible to being frosted in cold weather, this being due it is assumed to the partial desiccation or elimination of excessive moisture. It has been further discovered that the sweetness of the potatoes is enhanced and that their nutritive qualities are not affected.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

A house for preserving sweet potatoes comprising a framework inclosed at its bottom, top and sides and having a portion extending below the surface of the ground and a portion extending above the ground, said house having doors forming one of its sides, the floor of the house having a portion depressed and a portion elevated to form a cellar and a drying compartment, the top or roof of the house being weatherproof.

In testimony whereof I affix my signature in presence of two witnesses.

PHILLIP T. PARKER.

Witnesses:
ULAY W. BLACK,
THOMAS L. PARKER.

Copies of this patent may be obtained for five cents each, by addressing the "Commissioner of Patents, Washington, D. C."